United States Patent
Schulz et al.

(10) Patent No.: US 7,200,184 B2
(45) Date of Patent: Apr. 3, 2007

(54) DATA DITHERING APPARATUS AND METHOD

(75) Inventors: Gary Schulz, Cary, IL (US); Chris Fay, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 1090 days.

(21) Appl. No.: 10/158,341

(22) Filed: May 30, 2002

(65) Prior Publication Data

US 2003/0223511 A1 Dec. 4, 2003

(51) Int. Cl.
*H04L 27/12* (2006.01)
(52) U.S. Cl. ..................................... 375/303
(58) Field of Classification Search ................ 375/272, 375/303, 237–239; 332/100, 109, 112, 115
See application file for complete search history.

(56) References Cited

U.S. PATENT DOCUMENTS

| | | | | |
|---|---|---|---|---|
| 5,329,258 A | * | 7/1994 | Matsuura | 332/100 |
| 5,825,243 A | * | 10/1998 | Sato et al. | 329/311 |
| 2002/0180547 A1 | * | 12/2002 | Staszewski et al. | 332/115 |

* cited by examiner

*Primary Examiner*—Khanh Tran

(57) ABSTRACT

A waveform having an amplitude that varies to thereby represent corresponding data values is dithered to further shape the waveform so that use of the dithered waveform to create a corresponding FSK signal will result in a signal having a smoothed frequency domain profile. In various embodiments, the waveform amplitude is varied with respect to periodicity of variation, extent of variation, and duration of variation.

24 Claims, 4 Drawing Sheets

11—PROVIDE DATA ELEMENTS

12—VARY PARAMETER AMPLITUDE

13—PROVIDE FSK SIGNAL

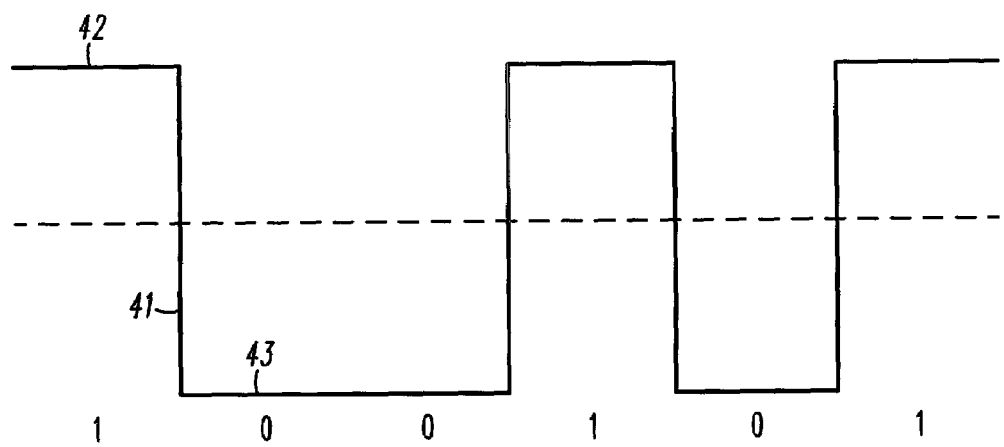
FIG. 4 —PRIOR ART—
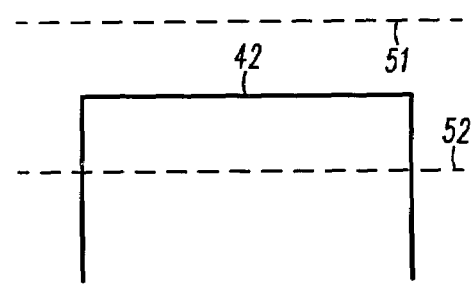
FIG. 5
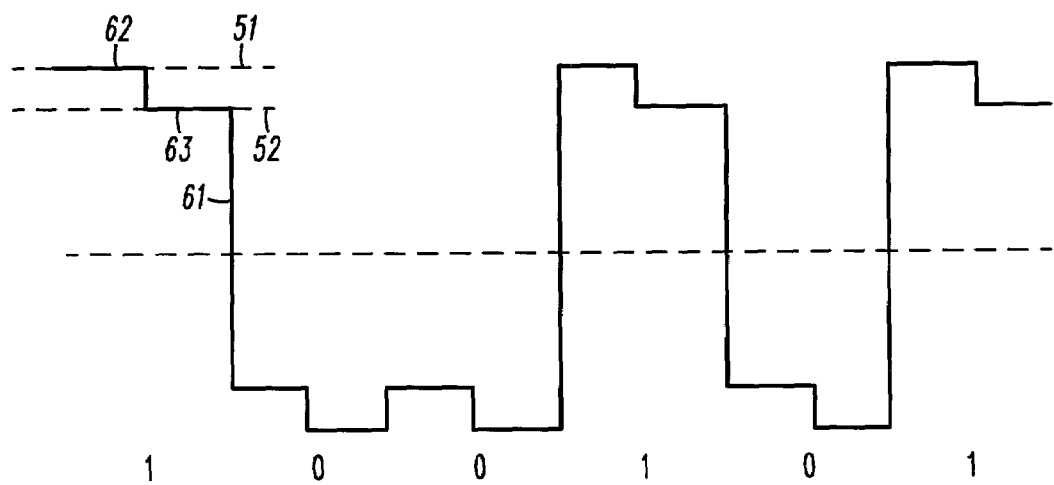
FIG. 6

—PRIOR ART—

DATA DITHERING APPARATUS AND METHOD

TECHNICAL FIELD

This invention relates generally to data transmission and more particularly to frequency shift keyed (FSK) data transmission.

BACKGROUND

Transmission of data (including binary data and multicomponent symbols and vectors) is a generally well understood and developed area of art. FSK comprises one particularly well understood form of data representation. Generally speaking, with FSK, a carrier signal is modulated with a signal having an amplitude that varies (or "shifts") as a function of the data elements being represented. For example, a logical "1" can be represented by a series of pulses having a first amplitude and a logical "0" can be represented by a series of pulses having a second and different amplitude (in most FSK systems, this timevarying amplitude variation comprises the parameter that controls the timevarying frequency of a voltage controlled oscillator). When using FSK modulation in a wireless context, it is known that the resultant transmission will not be evenly distributed with respect to power over the frequency domain. Rather, increased power will exist that reflects "tones" that correspond to the frequencies that represent the data.

For many applications, such an uneven frequency domain profile does not result in any particular problems. There are situations, however, where such phenomena is troublesome. For example, when used to support relatively high speed data transmissions (such as 10 to 20 Mbps or higher) in the U-NII mid band (5.25 to 5.35 GHz) or the U-NII upper band (5.725 to 5.825 GHz), such distorted spectral profiles in turn typically require reduced transmission power in order to otherwise comply with regulations regarding allowed power at such bands. Such reduction, in turn, leads to a reduced effective transmission range.

Because of such problems, system operators must often either install a significantly large number of transmitters to ensure adequate coverage over a given service area or use an alternative data transmission technology that itself presents other concerns and issues (for example, orthogonal frequency division multiplexing is often considered for such use at such bands, but itself constitutes a somewhat non-robust approach that is also relatively expensive).

A desire therefore exists to use FSK for such purposes, but the reduced range of present solutions have tended to move many users to other approaches and/or to accept the burden and costs of installing and maintaining a large number of FSK transmitters for a given area of overall coverage.

BRIEF DESCRIPTION OF THE DRAWINGS

The above needs are at least partially met through provision of the data dithering apparatus and method described in the following detailed description, particularly when studied in conjunction with the drawings, wherein:

FIG. 4 comprises a depiction of a control waveform for a parameter controlled oscillator as configured in accordance with the prior art;

FIG. 5 comprises a close-up depiction of a portion of a control waveform as configured in accordance with an embodiment of the invention;

FIG. 6 comprises a depiction of a control waveform as configured in accordance with an embodiment of the invention;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to many of these various embodiments, data elements are represented via at least one parameter, which parameter has a representative amplitude that varies in correspondence with information values that correlate to the data. For at least one of the data elements (and in a preferred embodiment, substantially all of them), this parameter amplitude is varied by a relatively small amount to thereby provide an amplitude-irregular data element. This amplitude-irregular data element is, in turn, used to provide a corresponding frequency shift keyed signal. In general, though there are various ways in which to so vary the parameter amplitude, the resultant frequency domain profile of the frequency shift keyed signal will be smoother than an untreated frequency shift keyed signal for the same data elements. Because the resonant tones are effectively moderated, the transmission power can be increased and the effective range of the transmission considerably extended. For example, where a system using untreated FSK might be limited to a coverage radius of approximately 1.5 miles, a system using dithered parameter amplitudes as described above can be extended to approximately 3.0 miles (due, for the most part, to an approximately 6 dB advantage in favor of the dithered approach). This significant improvement permits considerably fewer base sites to be used for a given service area while concurrently permitting FSK and its otherwise relatively robust characteristics to be beneficially utilized.

In different embodiments, the parameter amplitude can be varied as a function of predetermined or random (or pseudo-random) amplitude increments. The amplitude can be increased by one or more such increments, decreased, or left unaltered. In a preferred embodiment, the dithering rate (that is, the rate at which the amplitude is so altered) exceeds the symbol rate for the data source. In various embodiments the amount of time that each alteration is asserted can be fixed or varied.

Figure 1:
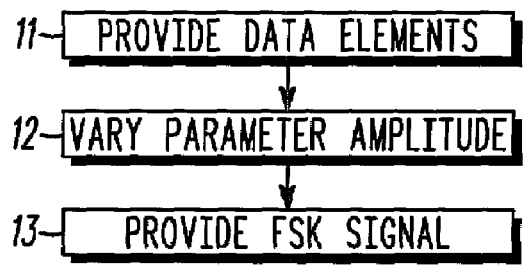
FIG. 1 comprises a general flow diagram as configured in accordance with an embodiment of the invention.

Referring now to FIG. 1, and viewed generally, data elements are provided 11. These data elements are characterized by at least one parameter, such as a voltage or current level, that has an amplitude that varies to reflect the corresponding information values. This parameter amplitude is varied 12 and the resultant amplitude-irregular data element is then used to provide 13 a corresponding FSK signal that appropriately represents the original information while presenting a smoothed frequency domain profile.

Figure 2:
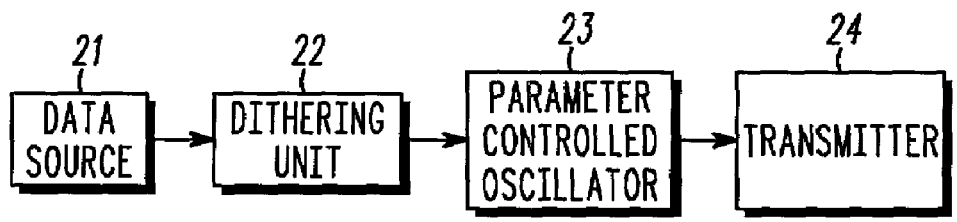
FIG. 2 comprises a block diagram as configured in accordance with an embodiment of the invention.

With reference to FIG. 2, a data source 21 providing a series of such information values couples to a dithering unit 22 that effects the amplitude variation noted above. The resultant data elements featuring the amplitude-varied parameter are then provided to an appropriate parameter controlled oscillator 23 (for example, if the parameter comprises voltage then the parameter controlled oscillator can be a voltage controlled oscillator and if the parameter comprises current then the parameter controlled oscillator can be a current controlled oscillator, with other parameters of course being usable as desired). The FSK results from the parameter controlled oscillator 23 are then provided to a wireless transmitter 24 (operating, for example, in the U-NII mid band or upper band). The resultant signal can be received, demodulated, and decoded in ordinary course without need for additional or alternative processing. (Another more complex option would include applying a correlated but phase-adjusted correction signal to the demodulated baseband on the receive side. This would in effect remove some or all of the time-varying dithering from the received signal and potentially yield slightly better signal to noise performance.).

Figure 3:
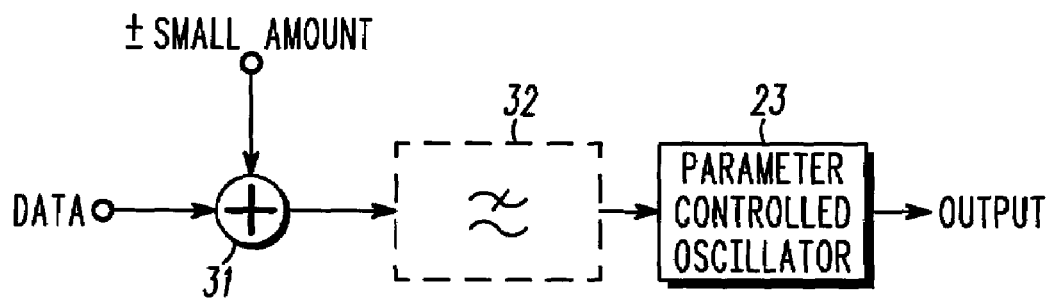
FIG. 3 comprises another block diagram as configured in accordance with an embodiment of the invention.

Referring now to FIG. 3, one way to so dither the data is to simply sum 31 the data with small adjustment values (additional description and illustrations regarding this aspect are provided below). The adjusted data is then optionally (though preferably) passed through an appropriate low pass filter 32 in accordance with well understood prior art technique before being provided to the parameter controlled oscillator 23 as otherwise related above. The summation activity described above can be realized in a variety of ways. An actual summer can be used if desired. In the alternative, since the data element parameter amplitudes are already known, pre-calculated altered parameter amplitudes can be stored and then recalled to provide the summation results as needed to effect the summation event. The latter approach is particularly well suited to an implementation that makes use of a programmable gate array.

FIG. 4 depicts a waveform 41 comprising a series of data elements as well understood in the art and constitutes, in this example, a non-return-to-zero waveform (so-called because the data values themselves are not correlated to a zero value for the amplitude of the waveform). This particular waveform 41 shifts between a high amplitude level 41 to represent a logical "1" and a low amplitude level 43 to represent a logical "0". The formation and interpretation of such a waveform is well understood in the art and hence additional description will not be provided here for the sake of brevity and the preservation of focus.

Pursuant to these various embodiments, the amplitude of the waveform is slightly altered for the reasons otherwise set forth. With reference to FIG. 5, for example, the high amplitude level 42 noted above, in one embodiment, can be varied between an upper limit 51 and a lower limit 52. These limits 51 and 52 circumscribe the extent to which the amplitude level can be altered. In general, the total range of variation should be relatively small with respect to the absolute magnitude of the waveform itself. The precise range can be selected to accommodate a variety of factors, but the applicant notes that a range that does not exceed 4.0% of the high or low amplitude level works well for the purposes stated. For example, if the high amplitude level 42 is a approximately 5 volts (with a corresponding low amplitude level 43 of approximately −5 volts) then a range of plus and minus 0.2 volts will function as a serviceable range. Again, other ranges, including larger or more limited ranges, can provide satisfactory results as well.

Referring now to FIG. 6, a waveform 41 comprised of data elements as illustrated in FIG. 4 can be dithered to provide, in this illustrative example, an amplitude-irregular data element having two amplitude levels (such as the two levels denoted by reference numerals 62 and 63) for each logic value. Also in this embodiment, the small amplitude variations are made in a regular fashion, that is, the variations alternate between the higher variation limit 51 and the lower variation limit 52 for both the high amplitude levels and the low amplitude levels of the original waveform 41. In this fashion, the average amplitude for each data element will be approximately equal to the original undithered amplitude value (since half the waveform is presented above this amplitude value and the second half of the waveform is presented an equal amount below this amplitude value). In fact, it is not necessary that the average amplitude for each data element be exactly equal to the undithered amplitude so long as the resultant waveform is not so removed from the original amplitude as to render it difficult to later recognize and decode the result as the proper corresponding data value.

Figure 7:
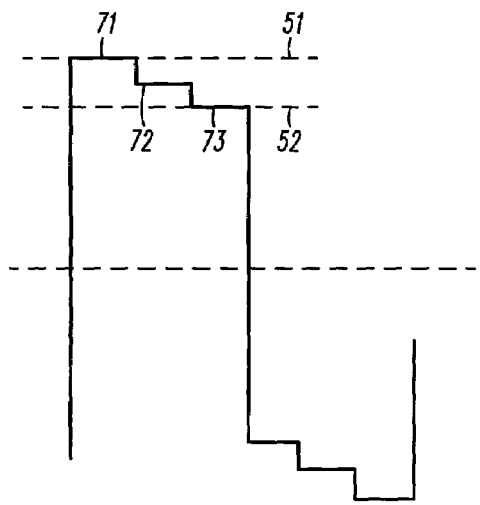
FIG. 7 comprises a depiction of a control waveform as configured in accordance with another embodiment of the invention.

As already noted, in the just described embodiment, the amplitude value changes twice for each data element and always changes pursuant to a simple repetitive pattern. In fact, many other variations on these themes are possible and, in some instances, are beneficial as well. For example, with reference to FIG. 7, the amplitude of each data element can be varied three times instead of twice. As a further point of difference, the amplitude variations can include the original unaltered amplitude level. To illustrate these points, a single data element representing a logical "1" can be varied three times using a variance pattern comprising using the highest variation level 51 followed by the unaltered amplitude level followed by use of the lowest variation level 52. This will result in a first portion 71 of the data element being presented at the highest variation level 51, followed by a second portion 72 that is presented at the unaltered amplitude level, followed lastly by a third portion 73 that is presented at the lowest variation level 52. In this embodiment, the variation pattern then repeats in similar fashion for each subsequent data element. So configured, the waveform amplitude spends less time at any given value than when only two variations per data element are provided. As a result, the frequency domain profile will typically be smoothed further yet as the corresponding FSK signals exhibit slightly less resonance at any specific frequency.

Figure 8:
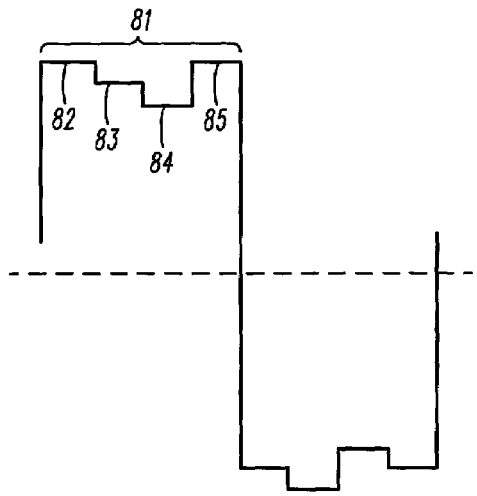
FIG. 8 comprises a depiction of a control waveform as configured in accordance with yet another embodiment of the invention.

Referring now to FIG. 8, a similar 3-step pattern of altering the amplitude level can be employed while changing the amplitude level four times per data element. Pursuant to this approach, a high level 82, medium level 83, and low level 84 amplitude are again provided for the first data element 81. Here, however, a fourth alteration is made as well. Since the same variation pattern is used here as before, the fourth alteration comprises a high level 85 amplitude. The next sequential data element than begins with use of the next sequential amplitude variation level or change. It should be noted that, in this embodiment, the average amplitude for a given data element may, or may not, equal the original unaltered amplitude for that data element. Nevertheless, it can reasonably be said that the average amplitude is substantially equal to the original amplitude, at least sufficient to ensure accurate decoding upon receipt.

It is of course possible to alter the representative amplitude of the data elements a greater number of times than the two, three, or four times described above. For example, five, six, or even more variations per data element could be accommodated if desired. In some instances a greater number of variations may facilitate further smoothing of the resulting spectral profile.

There are other ways in which the amplitude can be varied. For example, with reference to FIG. 9, five different resultant variation levels can be used rather than the two or three levels described above. As illustrated, this could be implemented by providing the original unaltered amplitude level along with two greater and two lesser variation levels. If desired, even more potential variation amplitude levels could be provided.

Figure 9:
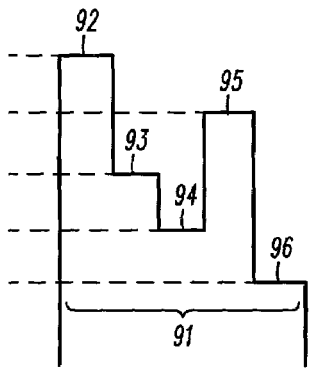
FIG. 9 comprises a depiction of a control waveform as configured in accordance with yet another embodiment of the invention.

Another way in which the amplitude can be varied, and with continued reference to FIG. 9, is to vary the amplitude in a random (or at least in a pseudo-random) fashion rather than pursuant to a fixed repeating pattern as is described above. In the illustration shown, for a given data element 91 for which five amplitude variations are going to be provided, a random selection might yield the result shown, where the highest variation level 92 is followed by the medium level 93, the next lowest level 94, the level 95 one step above the medium level, and lastly by the lowest variation level 96. Subsequent data elements could then use these same amplitude variation levels in a similar substantially random order of selection. One potential advantage of more randomly selecting the amplitude variation levels is that this approach may result in further smoothing of the corresponding spectral profile.

In has been shown in the embodiments described that data elements represented by the amplitude of a waveform can be varied in a variety of ways, including with respect to the number of times the amplitude is varied for each data element, the number of potential amplitude values to which the waveform may be varied, and the pattern (or lack thereof) by which such variations occur. All of these variables can be utilized (or excluded) as desired and as appropriate to yield a sufficiently smoothed spectral profile for the purposes of a given design and set of requirements.

Figure 10:
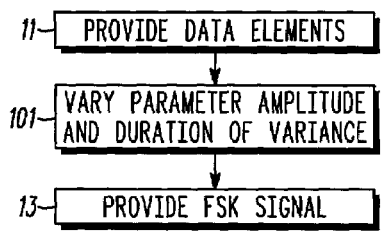
FIG. 10 comprises a flow diagram as configured in accordance with another embodiment of the invention.
Figure 11:
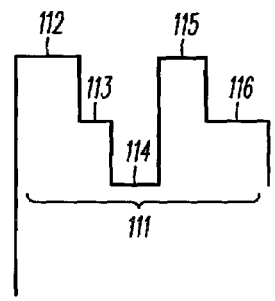
FIG. 11 comprises a depiction of a control waveform as configured in accordance with another embodiment of the invention.

There is yet another way in which the waveform amplitude can be varied that can yield beneficial results under at least some operating circumstances. With reference to FIG. 10, as before, a plurality of data elements are provided 11. In this embodiment, however, not only is the relevant parameter amplitude varied (in any combination or permutation of the embodiments described and suggested above), but the duration of the variation is varied 101 as well. For example, and referring now to FIG. 11, a given data element 11 can have its representative amplitude varied five times as illustrated above with reference to FIG. 9. In addition, a three-tier repetitive variation pattern as described above with respect to FIGS. 7 and 8 is also used. In this embodiment, however, the duration of each variation is also altered. For example, as illustrated, the first 112 and last 116 amplitude variations have a relatively lengthy duration, whereas the third 114 and fourth 115 variations have a duration of moderate length and the second 113 variation has a relatively short duration. Varying the duration of the amplitude variations can further minimize the resonance effects that give rise to the spectral bumps or lobes that characterize the prior art techniques. As with amplitude variations, these time variations can be selected from as few or from as many potential duration intervals as may be desired. Further, the time variations can be applied pursuant to a repetitive pattern or in a more random manner, again as may be desired.

Figure 12:
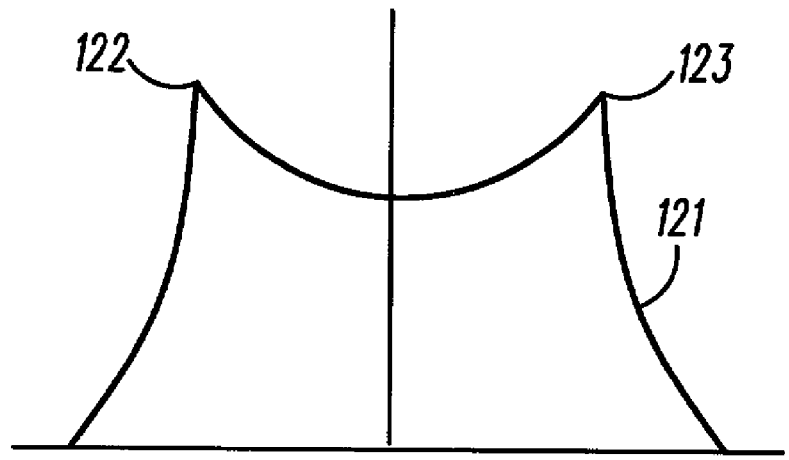
FIG. 12 comprises a frequency spectrum view of an FSK signal in accordance with the prior art.
Figure 13:
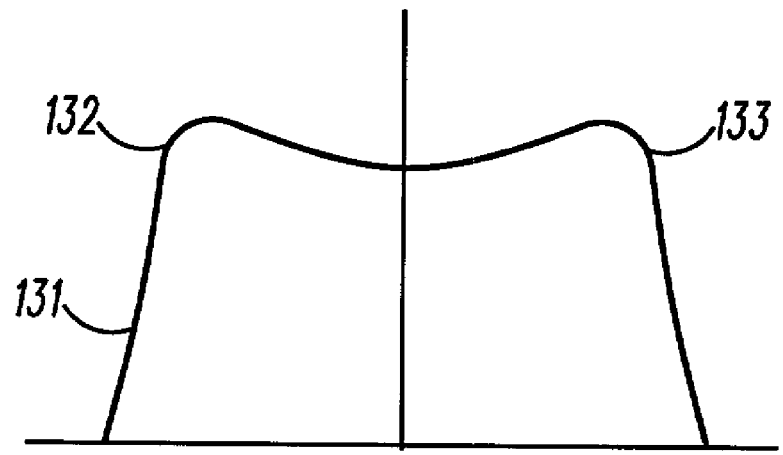
FIG. 13 comprises a frequency spectrum view of an FSK signal in accordance with various embodiments of the invention.

Through these various embodiments the amplitude of a waveform that varies in correspondence with information values can be shaped or dithered to at least occasionally vary the amplitude without losing the correlation between the amplitude in general and the corresponding data. The resultant shaped waveform can then be used to provide a corresponding frequency shift keyed signal having a smoothed frequency domain profile. Referring to FIG. 12, a typical FSK transmission using ordinary prior art techniques will yield a signal having a spectral profile 121 that is characterized by lobes (or "ears" as they are sometimes called) 122 and 123. These significant spectral excursions significantly impact the overall apparent power of the signal. Conversely, using the techniques taught herein, a smoothed frequency domain profile 131 as depicted in FIG. 13 can be expected. As a result of the smoothing, the tone-based lobes 132 and 133 are considerably reduced with respect to the remaining profile. This, in turn, beneficially impacts apparent power to the extent that increased transmission power can be employed while remaining compliant with average power restrictions and requirements. And increased transmission power, of course, equates to a significant increase in the effective corresponding coverage area.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising the steps of:
providing data elements comprising at least one parameter having a representative amplitude that varies in correspondence with information values that correlate to the data;
for at least one of the data elements, varying the amplitude by a relatively small amount to provide an amplitude-irregular data element;
using the amplitude-irregular data element to provide a corresponding frequency shift keyed signal having a smoothed frequency domain profile.

2. The method of claim 1 wherein the at least one parameter comprises a voltage level.

3. The method of claim 1 wherein the at least one parameter comprises a current level.

4. The method of claim 1 wherein the representative amplitude varies between approximately 5 volts as corresponds to a logical "1" and approximately −5 volts as corresponds to a logical "0".

5. The method of claim 1 wherein the relatively small amount comprises no more than approximately 4.0% greater and 4.0% less than a given representative amplitude.

6. The method of claim 5 wherein the representative amplitude varies between approximately 5 volts as corresponds to a logical "1" and approximately −5 volts as corresponds to a logical "0" and the relatively small amount comprises approximately 0.2 volts greater and less than the representative amplitude.

7. The method of claim 1 wherein, for at least one of the data elements, varying the amplitude by a relatively small amount to provide an amplitude-irregular data element includes so varying the amplitude for a plurality of the data elements.

8. The method of claim 7 wherein so varying the amplitude for a plurality of the data elements comprises so varying the amplitude for substantially all of the data elements.

9. The method of claim 1 wherein varying the amplitude by a relatively small amount includes varying the amplitude a plurality of times by a relatively small amount for a single one of the data elements.

10. The method of claim 9 wherein varying the amplitude a plurality of times by a relatively small amount for a single one of the data elements includes varying the amplitude at least 3 times by a relatively small amount for a single one of the data elements.

11. The method of claim 10 wherein varying the amplitude at least 3 times by a relatively small amount for a single one of the data elements includes varying the amplitude at least 4 times by a relatively small amount for a single one of the data elements.

12. The method of claim 1 wherein varying the amplitude by a relatively small amount to provide an amplitude-irregular data element includes varying the amplitude by a relatively small amount to provide an amplitude-irregular data element having an average amplitude value that is at least approximately equal to the representative amplitude for such data element.

13. The method of claim 1 wherein varying the amplitude by a relatively small amount to provide an amplitude-irregular data element includes varying the amplitude by a relatively small amount for varying amounts of time to provide an amplitude-irregular data element.

14. The method of claim 13 wherein varying the amplitude by a relatively small amount for varying amounts of time includes varying the amplitude by a relatively small amount for at least pseudo-randomly varying amounts of time.

15. An FSK transmitter including:
a data source having an output that provides data elements comprising at least one parameter having a representative amplitude that varies in correspondence with information values that correlate to the data;
a data element dithering unit having an input operably coupled to receive the data elements and an output that provides dithered data elements wherein the at least one parameter has a dithered amplitude;
a parameter controlled oscillator having an input operably coupled to receive the dithered data elements and an output that provides a signal having a frequency that varies as a function, at least in part, of the dithered data elements.

16. The FSK transmitter of claim 15 wherein the parameter comprises voltage.

17. The FSK transmitter of claim 16 wherein the parameter controlled oscillator comprises a voltage controlled oscillator.

18. The FSK transmitter of claim 15 wherein the data elements comprises non-return-to-zero data elements.

19. The FSK transmitter of claim 15 wherein the dithered amplitude of a dithered data element has an average value that is at least approximately equal to the representative amplitude as corresponds to the dithered data element.

20. The FSK transmifter of claim 15 wherein the data element dithering unit includes dithering means for dithering the representative amplitude of a given data element by a dithering amplitude that comprises a relatively small fraction of the representative amplitude.

21. The FSK transmitter of claim 20 wherein the dithering amplitude comprises no more than approximately 4.0% of the representative amplitude.

22. The FSK transmitter of claim 20 wherein the dithering means further dithers the representative amplitude of a given data element a plurality of times.

23. The FSK transmitter of claim 22 wherein the dithering means further dithers the representative amplitude of a given data element both above and below the representative amplitude.

24. The FSK transmitter of claim 20 wherein the dithering means dithers the representative amplitude of a given data element at a dithering rate that exceeds a symbol rate for the data source.

* * * * *